United States Patent
Weir et al.

[11] Patent Number: 5,906,391
[45] Date of Patent: May 25, 1999

[54] DUAL CHAMBER AIRBAG WITH IMPROVED ASSEMBLY FEATURES

[75] Inventors: Brian Arthur Weir, Rochester Hills; Jonathan Paul Hurford, Lake Orion, both of Mich.

[73] Assignee: Takata, Inc., Auburn Hills, Mich.

[21] Appl. No.: 08/906,053

[22] Filed: Aug. 5, 1997

[51] Int. Cl.⁶ .................................................. B60R 21/24
[52] U.S. Cl. ........................................ 280/729; 280/743.1
[58] Field of Search .............................. 280/729, 730.2, 280/730.1, 743.1, 743.2; 493/210, 267, 931

[56] References Cited

U.S. PATENT DOCUMENTS

| | | | |
|---|---|---|---|
| 4,300,894 | 11/1981 | Cumming et al. | 280/729 |
| 5,282,646 | 2/1994 | Melvin et al. | 280/729 |
| 5,310,214 | 5/1994 | Cuevas | 280/729 |
| 5,536,038 | 7/1996 | Bollaert et al. | 280/730.2 |
| 5,586,782 | 12/1996 | Zimmerman, II et al. | 280/730.2 |
| 5,683,109 | 11/1997 | Birman | 280/743.2 |
| 5,692,774 | 12/1997 | Acker et al. | 280/729 |
| 5,730,464 | 3/1998 | Hill | 280/730.2 |

FOREIGN PATENT DOCUMENTS

| | | |
|---|---|---|
| 0 769 428 A2 | 4/1997 | European Pat. Off. . |
| 6-227348 | 8/1994 | Japan . |

*Primary Examiner*—Peter C. English
*Attorney, Agent, or Firm*—Harness, Dickey & Pierce, P.L.C.

[57] ABSTRACT

A dual chamber airbag and method for making a dual chamber side impact airbag with an integral vented panel. A partial vent panel is formed from a section in each airbag piece such that the to partial panels meet as the airbag pieces are assembled to make the airbag. The two panels are subsequently sewn together, thereby forming an integral vented panel separating an upper and lower chamber within the airbag.

18 Claims, 4 Drawing Sheets

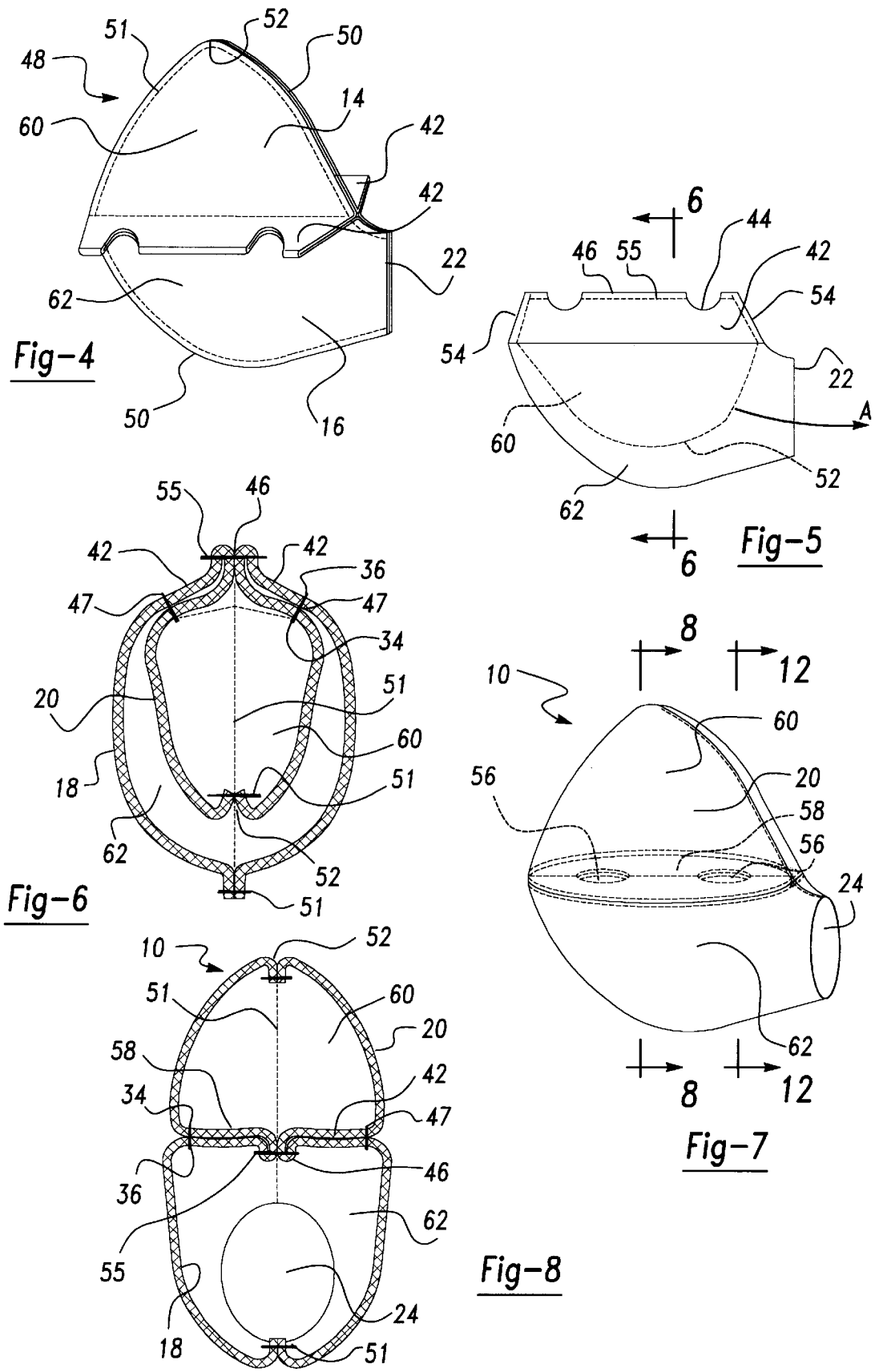

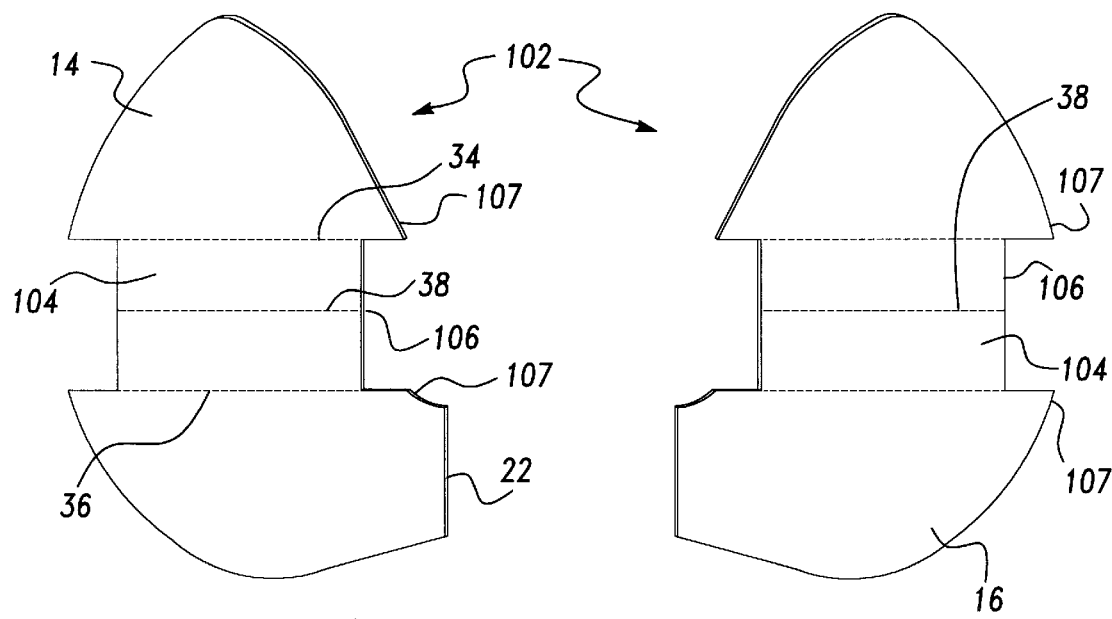
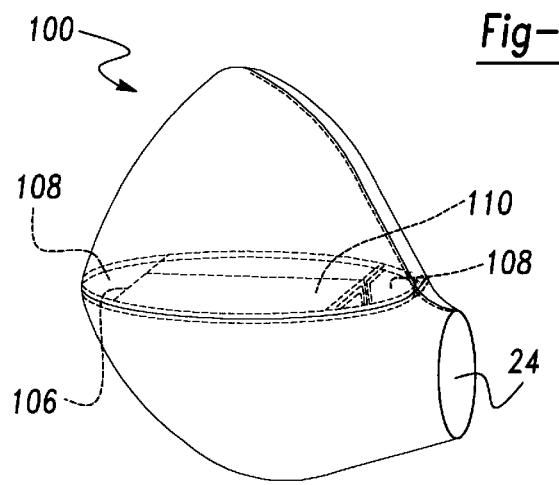
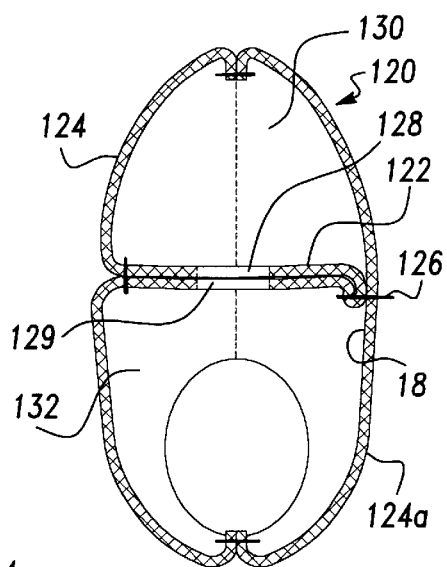
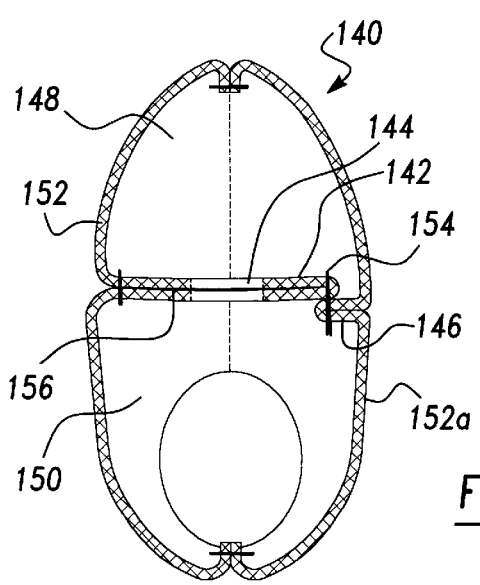
Fig-10
Fig-11
Fig-12
Fig-13

DUAL CHAMBER AIRBAG WITH IMPROVED ASSEMBLY FEATURES

BACKGROUND OF THE INVENTION

1. Field of the Invention

The present invention relates to a side impact airbag, and more specifically, to a dual chamber side impact airbag with an integral vent panel and an improved method for making the dual chamber airbag.

2. Discussion

Side impact vehicle collisions have caused a significant percentage of vehicle driver and passenger injuries. In order to minimize these injuries, several versions of side impact airbag systems have been developed. Many of these variations have involved different locations of the airbag system and various sizes and shapes of the airbags. Typically, these systems are installed on the outboard side of a seat back, on the door, or on the A or B pillars of a vehicle.

In order to provide protection for the occupant, an airbag of substantial size which deploys quickly is desired to fill the area between the occupant and the vehicle interior during a collision. Rapid inflation is particularly important for side impact airbags where very little time is available between sensing an impact and deploying the restraint. However, traditionally the larger the airbag, the slower the fill time is for that airbag. It is, of course, desirable to have the protection of a large airbag but with the inflation performance of a smaller airbag. This can be accomplished by utilizing a dual chamber airbag with a vented panel or membrane separating the upper and lower chambers. Studies have shown that the impact of the occupant's head to the head region of the airbag occurs after the impact of the occupant's torso with the lower torso region of the airbag. Therefore, it is desirable to have an airbag that rapidly fills the lower chamber, and later fills the upper chamber as it is needed. By providing delayed pressurization of the upper chamber the airbag can achieve better performance by providing a more rapid inflation of the lower chamber.

One type of dual chamber airbag is filled by an inflator connected to an opening in the lower thorax chamber. A panel is provided between the lower chamber and the upper chamber. The panel includes a vent so that the inflation gas may pass from the lower chamber into the upper chamber. The improvement accomplished by such an airbag is that the lower chamber is inflated rapidly, similar to a small airbag, and protects the thorax of the occupant. The upper head chamber is then inflated. The inflation of the upper chamber is also rapid because it is inflated as the thorax of the occupant presses against the thorax chamber, thereby forcing more gas through the vent in the panel and into the head chamber. All of this occurs before the occupant's head contacts the airbag. The end result is an airbag with the inflation performance of a small airbag in the thorax region, where it is necessary, and a slower inflation response to the upper head region where the occupant's head contacts the airbag at a later time than the occupant's thorax.

Dual chamber airbags, similar to the one described above, are not new in the art. Two general types are available. One type comprises two separate airbags, a larger upper airbag and a smaller lower airbag. The two airbags are sewn together such that openings located on the upper surface of the lower airbag and on the lower surface of the upper airbag correspond with each other and allow the inflation gas to communicate between the two airbags.

The process required to make the dual airbag described above involves a great number of steps and a large number of parts. First, both airbags have to be cut and sewn together. Following completion of that step, the two separate airbags have to be aligned and sewn together such that the opening in each airbag corresponds with the opening in the other airbag.

Another type of dual chamber airbag is a single airbag with a vented panel separating the airbag into its two separate chambers. This type requires several parts and several sewing and assembly steps in order to arrive at the completed airbag. Using known design approaches, five pieces of fabric must be cut and a hole must be cut in the separator panel. The two lower pieces and the two upper pieces are then joined together to form each separate chamber. The two chamber sections are then sewn together and the panel is attached along the seam that separates the two chambers. This entire process involves the cutting and sewing together of five separate pieces with the added concern of aligning the many different seams. This is both inefficient and expensive, due to the part proliferation and extra processes required for cutting five pieces and sewing them together. As with any process requiring additional steps increased waste can result when the pieces have to be scrapped because the later sewn seams are not properly aligned.

In view of the foregoing limitations and shortcomings of the prior art devices, as well as other disadvantages not specifically mentioned above, there is a need in the art for a more efficient method for making a vented dual chamber side impact airbag that involves fewer parts and processes.

It is therefore a primary object of this invention to fulfill that need by providing a side impact airbag with an upper and lower chamber separated by a vented panel.

It is another object of the present invention to provide an airbag with the vented panel separating the upper and lower chambers such that inflation of the upper chamber is controlled by the panel, resulting in an airbag which offers more rapid inflation to the lower chamber and delayed inflation to the upper chamber.

It is another object of this invention to provide an airbag where the vented panel is incorporated into the side pieces of the airbag itself, and not attached as a separate component of the airbag.

Finally, it is another object of this invention to provide an improved method for making a dual chamber side impact airbag with an integral vented panel, involving fewer parts and processes.

SUMMARY OF THE INVENTION

Briefly described, these and other objects are accomplished according to the present invention by providing a side impact airbag with an integral vent panel separating an upper and lower chamber.

The present invention provides for an improved dual chamber side impact airbag such that the final product will meet the performance characteristics described above. The dual chamber side impact airbag with an integral vented panel of the present invention involves only two pieces of material, not four or five as in the prior art, that will eventually make up the airbag. A portion of the vented panel is integral with each of the two airbag pieces. Each partial vent panel is formed by folding each airbag piece and sewing along the borders that surround the section of each piece that makes up the partial panel. The two airbag pieces are sewn together such that an airbag results with its inside surface facing outward. The two partial vent panels are then joined to form the vented panel, and the airbag is inverted by pulling the airbag through the inflator opening in the lower chamber. Therefore, the present invention limits the total number of parts to two, thereby minimizing part proliferation. Furthermore, because the present invention involves only aligning two pieces, there is a lesser concern that the seams, for the later sewing processes, are not properly aligned.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 4 is a perspective view of the airbag with its inside surface on the outside of the airbag, after the airbag has been sewn about its perimeter;

FIG. 5 is a perspective view of the airbag of FIG. 4 with the upper chamber (shown in phantom) pulled into the lower chamber such that the partial vent panel of each piece contacts one another;

FIG. 6 is a cross-sectional view of the airbag taken along line 6—6 in FIG. 5;

FIG. 7 is a perspective view showing the completed airbag with an integral vent panel formed therein;

FIG. 8 is a cross-sectional view of the completed airbag taken along line 8—8 in FIG. 7.

FIG. 10 is a plan view of the two airbag pieces of an alternate embodiment having the apertures in the vent panel formed by the ends of the vent sections;

FIG. 11 is a perspective view of the completed airbag of FIG. 10;

FIG. 12 is a cross-sectional view showing an alternate embodiment having a vent panel formed on only one of the two airbag pieces; and FIG. 13 is a cross-sectional view, similar to that of FIG. 12, showing an alternate embodiment having a large partial vent panel on one airbag piece attached to a small partial panel on the other airbag piece.

DETAILED DESCRIPTION OF THE PREFERRED EMBODIMENT

Figure 9:
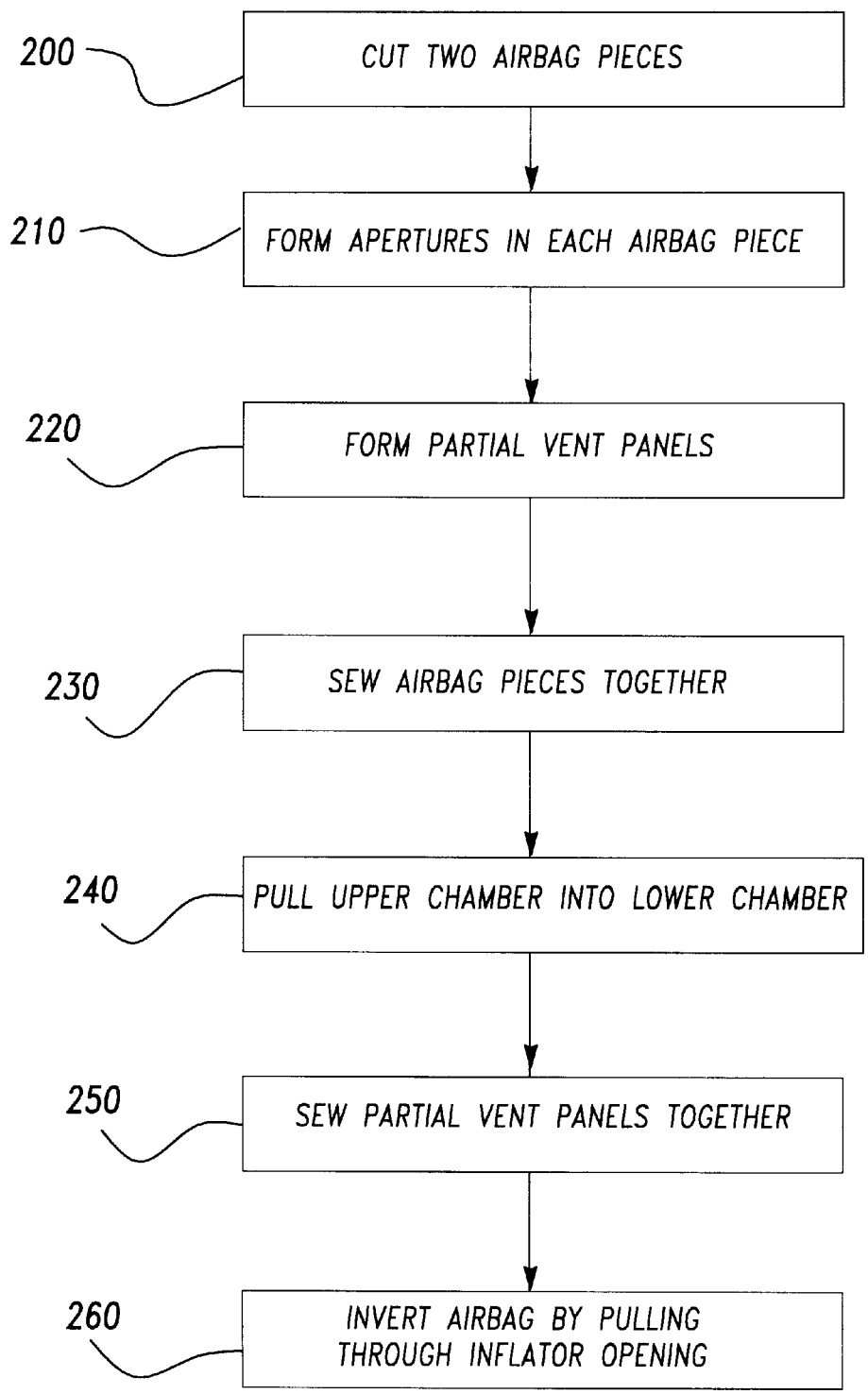
FIG. 9 is a flowchart representing the main steps in the preferred process for producing the airbag of the present invention.

Reference is made to each step of the flowchart shown in FIG. 9 as FIGS. 1–8 are described in greater detail. Like reference numbers will be used throughout the figures to depict like elements.

Figure 1:
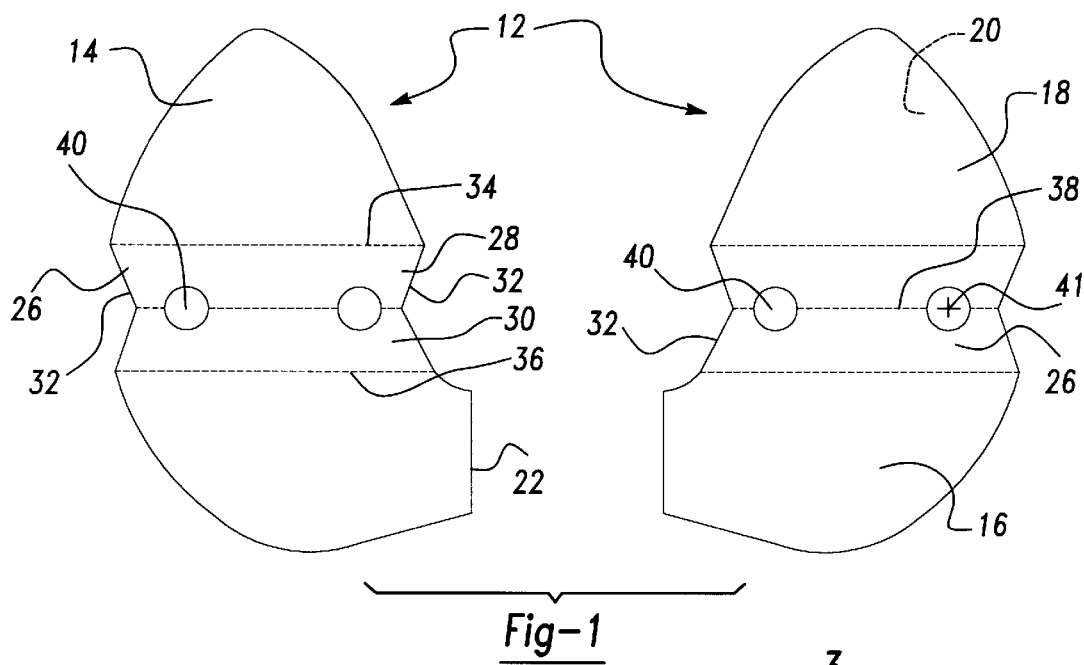
FIG. 1 is a plan view of the two airbag pieces as they are formed.

Referring now in detail to the drawings, there is shown in FIG. 1 both pieces 12 of the preferred embodiment of an airbag having an integral vented panel that is made in accordance with the teachings of the present invention. The airbag in finished form is generally referenced as 10 (FIG. 7), and is typically, but not limited to, being made of a woven fabric material, such as NYLON. It is contemplated by the inventors that a coating 70 (FIG. 3), such as chloroprene rubber or silicone rubber, may be applied to the inside and/or outside surface of the airbag, if such is required to meet the performance requirements of the airbag system. Furthermore, although the preferred embodiment is shown as a non-ventilated airbag, it is contemplated by the inventors to include a ventilation hole in either the upper or lower chamber, or both, such that the inflation gas can be rapidly discharged outside the airbag during deployment of the airbag to control the deployment of the airbag. Such ventilation holes can be located on either the inboard or outboard surface of the airbag and are typically developed during tuning of the airbag. To simplify the description of the present invention, it is important to note that, unless specified otherwise, each step detailed below is performed on each airbag piece 12 shown in FIG. 1.

The first step 200 in this process is to form two generally symmetrically opposite pieces 12 of the desired airbag. Each airbag piece 12 is made from one continuous piece of fabric and has an upper region 14, a lower region 16, an inside surface 18, and an outside surface 20. The lower region 16 includes an edge 22 that will form the inflator opening 24 (FIG.7) when the airbag 10 is completed. Between the upper and lower regions 14 and 16, respectively, is a vent section 26 with an upper portion 28 and a lower portion 30, whose sides 32 taper inward. The upper portion 28 has an upper border 34 and the lower portion 30 has a lower border 36. Portions 28 and 30 are separated by a centerline 38 that is generally equidistant between the upper border 34 and lower border 36. Each vent section 26 of the preferred embodiment has two apertures 40 formed along the centerline 38 of the vent section 26, as performed in step 210. The apertures are positioned along the centerline 38 such that the centerline 38 intersects the midpoint 41 of each aperture. Alternate embodiments can have more or less apertures 40, and such apertures may not be centered along the centerline 38 depending upon the desired performance characteristics of the airbag 10. However, an alternate embodiment must include a panel which allows inflation gas to flow between the upper and lower chambers of the airbag when the airbag is deployed.

Figure 2:
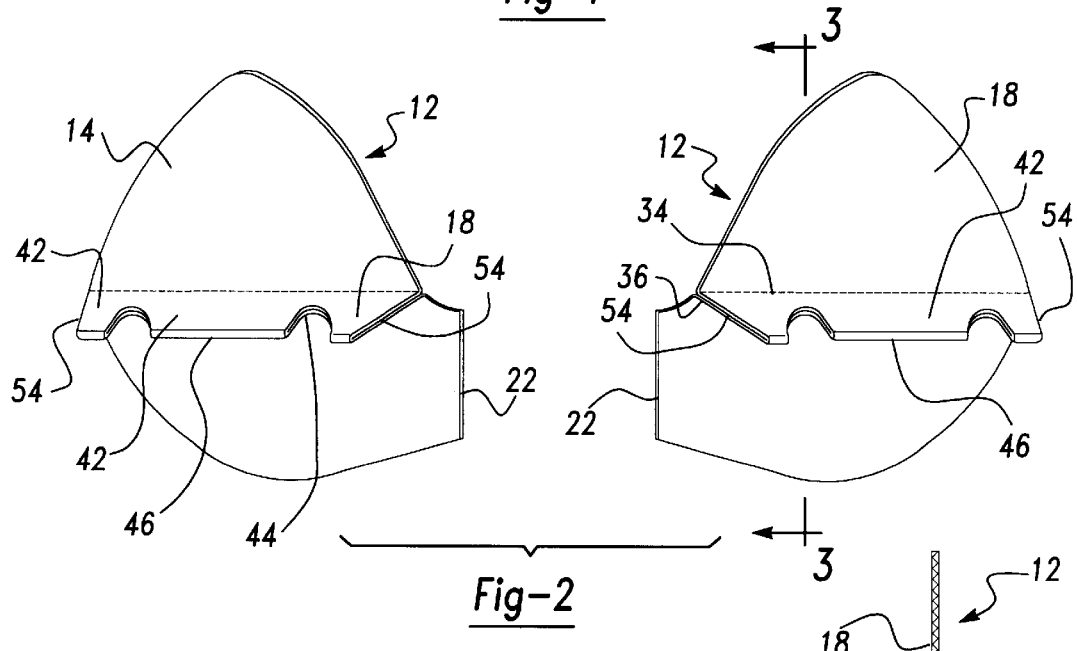
FIG. 2 is a perspective view showing each piece after the partial vent panels have been sewn across their borders.
Figure 3:
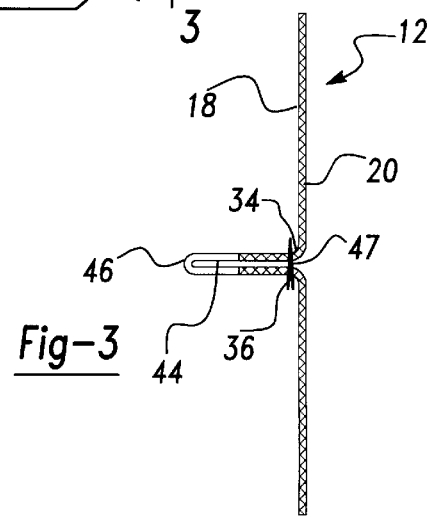
FIG. 3 is a cross-sectional view of one airbag piece taken along line 3—3 in FIG. 2.

The next step 220 is to form the partial vent panels 42 on each airbag piece 12. This is accomplished by sewing, or otherwise joining, the vent sections 26 of each airbag piece 12 along their upper and lower borders 34 and 36. FIG. 2 shows the preferred embodiment after the vent sections 26 have been sewn along their upper and lower borders 34 and 36. Each vent section 26 is first folded along its centerline 38 such that the outside surface 20 of each vent section 26 is folded upon itself and the upper and lower borders 34 and 36 are adjacent one another. The upper and lower borders 34 and 36 of each vent section 26 are then joined in order to form each partial vent panel 42. After the borders 34 and 36 have been aligned and sewn together, the partial vent panels 42 of the preferred embodiment project outward from the inside surface 18 with partial apertures 44 along their centerline edge 46 as shown in FIG. 3. A vertical line represents the stitching 47 along the borders 34 and 36. Extending between the borders 34 and 36 and the centerline edge 46 are two side edges 54, which taper inward toward the centerline edge 46. Although the preferred embodiment entails sewing the borders 34 and 36 of the vent sections 26, clearly other methods of joining the material, such as gluing with adhesives or melting the material, would accomplish the same end result and are clearly envisioned to be within the scope of the present invention.

Step 230 in this process is to sew or otherwise join the two airbag pieces 12 together to form an airbag with the inside surface 18 facing outward. The two airbag pieces 12 are first positioned such that their outside surfaces 20 are facing one another, and are then sewn together. FIG. 4 shows the initial airbag, shown generally as 48, after it has been sewn around substantially all of the perimeter 50 of each airbag piece 12. The inside surface 18 of each airbag piece 12 is on the outside of the initial airbag 48, such that the partial vent panels 42 project outward from each airbag piece 12 on either side of the airbag 48. The stitches 51 around the perimeter 50 are also shown in FIG. 4. The upper regions 14 of each airbag piece 12 form the upper airbag chamber 60 and the lower regions 16 form the lower airbag chamber 62. Edges 22 are left unattached so that the inflator opening 24 (FIGS. 7 and 8) may later be formed.

The process of making this airbag further involves inverting the initial airbag 48 such that the inside surface 18 is on the inside of the finished airbag 10. This is accomplished by reaching inside the airbag 48 through the unsewn edges 22 and grasping the top 52 of the upper chamber 60. The upper chamber 60 is then pulled into the lower chamber 62 until the centerline edges 46 of both partial vent panels 42 are adjacent one another, as shown in FIGS. 5 and 6 and indicated as step 240 in FIG. 9. Subsequently, step 250 is performed as the two partial vent panels 42 are sewn or otherwise joined together along the tapered side edges 54 and along both centerline edges 46. This step is best shown in FIG. 6. The stitches 51 around the perimeter 50 and the stitches 55 along the centerline edge 46 are also shown in FIG. 6. The partial apertures 44 along the centerline edges 46 of each partial vent panel 42 correspond with the partial apertures 44 on the other partial vent panel 42, thereby forming a generally circular or oval opening 56 in the finished vented panel 58. Although the two centerline edges 46 are shown sewn together where the centerline edges 46 meet, the two partial vent panels 42 could also partially overlap (not shown) such that one vent panel is sewn or joined atop the other, as long as the apertures on each partial vent panel correspond with the apertures on the other partial vent panel.

After joining the two partial vent panels 42, the airbag is completely inverted as noted in step 260 of FIG. 9. This is accomplished by pulling the top 52 of the airbag further in the direction of arrow A, as shown in FIG. 5, until both the upper chamber 60 and the lower chamber 62 are pulled through the inflator opening 24. Upon completion of this step, as shown in FIGS. 7 and 8, the completed airbag 10 has the outside surface 20 on the outside of the airbag and the vented panel 58 is on the inside of the airbag 10, separating the upper chamber 60 and the lower chamber 62. The vented panel 58 of the completed airbag 10 is best shown in FIG. 8. The finished product therefore has all of its seams hidden on the inside of the airbag. However, an airbag that is formed by first joining the partial vent panels 42 and then joining the airbag pieces 12 such that the vented panel 58 is inside the airbag is clearly within the scope of the present invention. Such an airbag would be functionally the same as the preferred embodiment, but would have the perimeter stitching 51 on the outside surface 20.

The edges 22 that are left open to form the inflator opening 24 of the preferred embodiment may instead be sewn together along with the perimeter 50, depending on the type of inflator that is incorporated into the airbag 10. The connection of the inflator (not shown) to the airbag 90 is not critical to this invention. However, clearly any number of know methods for retaining an inflator to the airbag can be applied according to the teachings of the present invention. Alternate methods include, but are not limited to, sewing the edges 22 together as the perimeter is sewn and inserting the inflator through an opening cut in one of the airbag pieces, inserting the inflator through the opening 24 and joining the edges 22 around the inflator, or connecting the inflator to the airbag by way of a mounting plate located within the opening 24 in the airbag.

To summarize the process for making the preferred embodiment, as set forth in FIG. 9, the present invention involves first cutting 200 two symmetrically opposite airbag pieces 12 with an inward tapered vent section 26. The second step 210 is to cut or otherwise form at least one aperture 40 within the vent section 26, either along the centerline 38 of the vent section 26, or on both sides of the centerline 38 such that the corresponding apertures align with each other to allow inflation gas to communicate between the upper and lower chambers 60 and 62 when the airbag is deployed. The third step 220, forming the partial vent panels 42 on each airbag piece 12, is accomplished by first folding each piece 12 over along the centerline 38 of the vent section 26 such that the outside surface 20 of each airbag piece 12 is folded over upon itself. The partial vent panels 42 are then completed by sewing or otherwise joining the borders 34 and 36 of the vent section 26 of each airbag piece 12. The result of this step is a partial vent panel 42 extending from the inside surface 18 of each airbag piece 12. The fourth step 230, sewing or otherwise joining the two side airbag pieces 12 together, is performed by first positioning the two airbag pieces 12 such that the outside surfaces 20 are facing one another, and then joining the two airbag pieces 12 about substantially all of their perimeters 50 such that the inside surfaces 18 of the airbag pieces 12 are on the outside of the airbag 48 that results therefrom. Upon completion of the airbag 48, the fifth step 240 is performed by pulling the upper chamber 60 of the airbag 48 downward into the lower chamber 62 until the centerline edges 46 of each partial vent panes 42 are adjacent one another. At this point, as indicated in step 250, the completed vented panel 58 is formed by joining the two partial vent panels 42 together along their centerline edges 46 and side edges 54. The final step 260, inverting the initial airbag 48 by pulling the top 52 of the airbag 48 further until the entire airbag is pulled through the inflator opening 24 in the lower chamber 62, results in the inversion of the airbag 48 such that the outside surface 20 of each airbag piece 12 is on the outside of the completed airbag 10 and an integral vented panes 58 is inside the airbag 10, thereby separating the upper and lower chambers 60 and 62 of the airbag 10.

Although the preferred embodiment, as discussed above, includes partial vent sections having apertures formed therein for communication of the inflation gas between the upper and lower chambers, the scope of the present invention clearly envisions alternate embodiments having partial vent panels with apertures of differing sizes, shapes or locations. These alternate embodiments still result in a completed airbag with a vented panel separating an upper and lower chamber, such that the vented panel is integral to one or both of the two airbag pieces. One such airbag 100 is shown in FIGS. 10 and 11. The airbag pieces 102 are similar to the airbag pieces 12 of the preferred embodiment in that the airbag pieces 102 are generally symmetrically opposite each other with a vent section 104 separating the upper and lower regions 14 and 16 of the airbag pieces 102. However, in this airbag 100 there are no apertures formed in the vent sections 104 themselves. The vent sections 104 are formed with a straight side edge 110 that is inward of the perimeter edge 107 of the airbag pieces 102. The vent sections 104 are folded upon themselves to form partial panels or flaps in the same manner as discussed above. The side edges 106 are located such that when the panels are joined and the airbag pieces 102 are joined about their perimeters, the venting apertures 108 of the completed airbag 100 are formed between the side edges 106 of the separating vent panel 110 and the airbag pieces 102. This embodiment results in an airbag 100 that has a separating vent panel 110 with two generally triangular apertures 108 at each end of the separating vent panel 110. The separating vent panel 110 itself is not vented in this alternate embodiment. The method of making this airbag 100 is generally the same as described above for the preferred embodiment.

Furthermore, although the preferred embodiment includes symmetrically opposite airbag pieces 12, each having generally equal sized partial vent panels 42, the scope of the present invention also clearly envisions alternate embodiments having partial vent panels of differing sizes or shapes. One such embodiment is shown in FIG. 12, which is a cross-sectional view similar to the view shown in FIG. 8 of the preferred embodiment. However, the airbag 120 of FIG. 12 is not made of two symmetrically opposite pieces. This embodiment has a vent panel 122 formed from only one of the two airbag pieces 124, which is then sewn, or otherwise joined, directly to the inside surface 18 of the other airbag piece 124a along the sew line 126. The airbag piece 124a does not have a vent panel formed thereon. At least two apertures 128 and 129 are formed in the first airbag piece 124 such that they align with each other when the airbag piece 124 is folded upon itself to form the vent panel 122. This is necessary to allow the inflation gas to communicate between the upper chamber 130 and the lower chamber 132 of the completed airbag 120.

Yet another embodiment that is within the scope of the present invention is the airbag 140, as shown in FIG. 13. This airbag 140 has one larger vented panel 142 with apertures 144 therein and one smaller non-vented panel 146 that is joined to the larger vented panel 142 in order to separate the upper and lower chambers 148 and 150 of the completed airbag 140. This airbag 140 is similar to the airbag 120 shown in FIG. 12 and discussed above, in that one vented panel 142 includes the apertures 144 and is formed from one airbag piece 152. However, the other airbag piece 152a of the airbag 140 has a smaller panel 146 extending inward when the airbag 140 is completed. The larger vented panel 142 attaches to the small panel 146 at the sew line 154 to form the completed vent panel 156 of the airbag 140. Although the alternate embodiments 120 and 140 discussed above do not include symmetrically opposite airbag pieces having generally equal sized partial vent panels, the method for making these airbags is generally the same as the method disclosed above for making the preferred embodiment of the present invention, and as indicated in FIG. 9.

While the embodiments disclosed above generally include one or more apertures in the integral vented panel separating the upper and lower chambers of the airbag, it is within the teachings of the present invention to include a panel having no apertures therein. Non-coated woven material may be utilized to allow the communication of inflation gas between the upper and lower chambers during deployment of the airbag. The porosity of the fabric itself allows the inflation gas to flow between the fibers of the material, thereby acting as a large number of fine venting apertures. In such an embodiment, some or all of the material forming the lower chamber may be coated to encourage the inflation gasses to pass from the lower chamber through the integral vented panel to the upper chamber upon loading of the lower chamber by the occupant's torso. Furthermore, one or both of the upper and lower chamber materials may be coated on one or both sides and may incorporate vent holes, as previously disclosed, while the integral vent panel portions of the material remain non-coated.

While the above description constitutes the preferred embodiment of the present invention, it will be appreciated that the invention is susceptible to modification, variation and change without departing from the proper scope and fair meaning of the accompanying claims.

What is claimed is:

1. A method for making a dual chamber airbag with an integral vented panel for allowing inflation gas to communicate therethrough, comprising the steps of:

forming a first airbag piece having a first surface, a second surface, and an outer perimeter;

forming a second airbag piece having a first surface, a second surface, and an outer perimeter;

forming a first vent panel from a portion of said first airbag piece by folding a portion of said second surface of said first airbag piece upon itself;

joining said airbag pieces around substantially all of their outer perimeters, and joining said first vent panel of said first airbag piece to said second airbag piece and turning said airbag pieces inside out to form an airbag having an integral vented panel formed inside said airbag, said integral vented panel separating said airbag into an upper chamber and a lower chamber such that inflation gas is allowed to communicate between said upper and lower chambers.

2. The method of claim 1 wherein said first vent panel of said first airbag piece is joined to said first surface of said second airbag piece.

3. The method of claim 1 further comprising the step of forming at least one aperture in said first vent panel.

4. The method of claim 1 wherein said first airbag piece further having a first vent section having an upper border, a lower border, and a centerline generally equidistant between said upper and lower borders, said step of forming said first vent panel including first folding said first airbag piece about said centerline of said first vent section such that said upper border and said lower border are adjacent one another such that said second surface of said first airbag piece is folded upon itself, and then joining said first airbag piece along said upper and lower borders, said first vent panel having a centerline edge and two side edges extending between said centerline edge and said joined borders.

5. The method of claim 4 wherein said first vent section having at least one aperture located between said upper border and said centerline and at least one aperture located between said lower border and said centerline, such that each said aperture between said upper border and said centerline aligns with one said at least one aperture between said lower border and said centerline when said first vent panel is formed on said first airbag piece.

6. The method of claim 4 wherein said second airbag piece further having a second vent section, said method further comprising the step of forming a second vent panel on said second airbag piece by folding said second surface of said second airbag piece upon itself along a centerline of said second vent section, wherein said first vent panel is joined to said second vent panel.

7. The method of claim 6 wherein at least one of said first and second vent panels having at least one aperture formed therethrough.

8. The method of claim 6 wherein said first and second vent panels being generally the same size.

9. The method of claim 8 wherein said first and second airbag pieces being generally symmetrically opposite each other.

10. The method of claim 6 further comprising the step of forming at least one aperture in each said first and second vent panels such that said centerlines of said first and second vent sections intersect a midpoint of each said aperture.

11. The method of claim 1, further comprising the step of coating said first surface of each said airbag piece with a rubber coating.

12. The method of claim 11, further comprising the step of coating said second surface of each said airbag piece with a rubber coating.

13. A dual chamber airbag for use in protecting an occupant of a vehicle during a side impact collision, said airbag comprising:

a first airbag piece having a perimeter;

a second airbag piece having a perimeter and being joined to said first airbag piece around substantially all of said perimeters to form an airbag, said airbag having an inside surface and an outside surface;

a vented panel separating said airbag into an upper inflatable chamber and a lower inflatable chamber, wherein a portion of said vented panel is integral with at least one of said pieces, said airbag being made from two continuous pieces of fabric;

wherein said vented panel is formed by first and second vent sections of said first and second airbag pieces, respectively, said first and second vent sections each being folded along a centerline thereof and having an upper border portion sewn to a lower border portion to form first and second vent panel portions, said first and second vent panel portions being sewn together generally along said centerlines to form said vented panel, said vented panel including at least one aperture therethrough communicating between said upper inflatable chamber and said lower inflatable chamber.

14. The dual chamber airbag of claim 13 wherein said second airbag piece is generally symmetrically opposite said first airbag piece.

15. The dual chamber airbag of claim 13 wherein said inside surface of said airbag is coated with a rubber coating.

16. The dual chamber airbag of claim 15 wherein said outside surface of said airbag is coated with a rubber coating.

17. A dual chamber airbag for use in protecting an occupant of a vehicle during a side impact collision, said airbag comprising:

a first airbag piece having a perimeter;

a second airbag piece having a perimeter and being joined to said first airbag piece around substantially all of said perimeters to form an airbag, said airbag having an inside surface and an outside surface;

a vented panel separating said airbag into an upper inflatable chamber and a lower inflatable chamber, wherein a portion of said vented panel is integral with at least one of said pieces, said airbag being made from two continuous pieces of fabric; and wherein the entirety of said vented panel is integral with said first airbag piece, said vented panel being joined directly to said second airbag piece to separate said upper and lower chambers.

18. The dual chamber airbag of claim 17 wherein said vented panel includes at least one aperture therethrough.

* * * * *